United States Patent Office 3,391,115
Patented July 2, 1968

3,391,115
COATING COMPOSITIONS CONTAINING PHENOL MODIFIED POLYDIENE RESINS AND METAL DRIERS
Hans-Georg Kuenstler, Whitestone, Guy J. Del Franco, Brooklyn, and Eli J. Aronoff, Queens, N.Y., assignors to Interchemical Corporation, New York, N.Y., a corporation of Ohio
No Drawing. Filed Apr. 27, 1962, Ser. No. 190,787
11 Claims. (Cl. 260—51)

This invention relates to novel coating compositions containing phenol modified polydiene resins and metal driers.

In copending application No. 190,824, now Patent No. 3,258,450, entitled, "New Phenol Modified Polydiene Resins and a Process for Making Such Resins," filed on or about the same date as the present application in the names of E. Aronoff et al., the disclosure of which is hereby incorporated into and made a part of the present disclosure, there are described novel resins comprising phenols alkylated by polydiene resins. These novel resins are made by the alkylation of phenol materials, particularly phenol Bis-phenol A (2,2-diphenol propane) and naphthol with a synthetic polymer containing more than 5 repeating units of a monomeric material selected from the group consisting of butadiene, alkyl substituted butadiene and phenyl substituted butadiene, said resin having a softening point below 22° C. The reaction is preferably carried out in the presence of a catalyst consisting of a mixture of sulfuric acid and activated clay.

It has been now found that coating compositions having excellent curing rates and curing to an enhanced hard flexible coating may be made by mixing small amounts of a metal drier particularly cobalt, calcium, manganese and lead driers with the novel phenol modified polydiene resins described above. Best results have been achieved with cobalt driers. However, other metallic driers including iron, cerium, zirconium, vanadium and nickel may also be used. Preferably the metal content of the resulting mixture is from about .001% to 1% of the total mixture weight. (Unless otherwise stated, the proportions set forth in this specification and claims are by weight.) Best results have been obtained when the driers used were naphthenates of the above described metals. Good results have been achieved using the octoates and tallates of said metals. In addition the linoleates and resinates of the metals may also be used.

Within the preferred proportions set forth above, the most desirable proportions will vary with the metal used, e.g., cobalt content is preferably from .03 to 1%.

The aforementioned copending application is also directed to new methylolated resins produced by reacting formaldehyde with the novel phenol modified polydiene resins mentioned hereinabove. It has been found that the coating compositions of this invention may employ such a methylolated resin in place of phenol modified polydiene resins with similar good results.

Best results have been obtained when the phenol content (either methylolated or unmethylolated) of resin mixed with the metal drier is 7% or lower.

The novel coating composition of this invention preferably comprising the resin and metal drier is in a volatile organic solvent such as xylene, toluene, benzene, commercial high-flash naphthas and mineral spirits.

The drier is usually supplied commercially as a solution in mineral spirits.

The following examples will serve to further illustrate this invention:

Example 1

Buton 100—A copolymer of 20 parts of styrene and 80 parts butadiene (60% 1,2-unsaturated and 40% 1,4-unsaturated) having a molecular weight of 8000 to 10,000 and an iodine number of 300__g__ 600
Phenol _____g__ 25
Retrol clay—an activated clay having a 21% moisture content and the non-volatile content of which may be broken down as follows:
   $SiO_2$ 70.9%; $Al_2O_3$ 17.0%; $Fe_2O_3$ 3.9%; MgO 3.2%; CaO 1.6%; SO3 1.8%; $K_2O+N_2O$ 1.0%; TiO 0.6% _____g__ 30
Concentrated sulfuric acid _____cc__ 10
Xylene _____g__ 600

The Retrol clay and the sulfuric acid are mixed to form a slurry. The slurry is then mixed with the Buton 100, phenol and xylene and the mixture is heated to and maintained at about 100° C. for 7 hours under a nitrogen atmosphere. After the mixture cools, the Retrol clay is removed by filtration under a nitrogen atmosphere. The filtrate is steam distilled to remove the unreacted phenol overhead. The resulting solution has a 47% solids content of a copolymer comprising about 1.5% phenol and 98.5% Buton 100.

To 98 parts of the resulting copolymer as a 40% solution in xylene, there is added 2 parts of cobalt naphthenate solution in mineral spirits in which the cobalt content is 6%. The solution is roller coated on tinplate to give a dry film weight of 3.5 to 4.0 milligrams per square inch. After curing by baking at 204.5° C. for 12.5 minutes, the films are well cured, flexible and display good fabrication resistance and steam processing resistance.

Steam processing resistance is determined by contacting the coating with steam at 121° C. Films prepared in the above example withstood 60 minutes contact without showing any appreciable discontinuity to film or film blush.

By good fabrication resistance it is meant that the flat sheets of tinplate coated with the cured film can be fabricated into can ends without seriously disrupting the film.

The above tests indicate that the cured films of the novel compositions of this invention are very desirable coatings for the insides of metal food containers.

Example 2

The copolymer of Example 1 is methylolated by reacting 300 g. of a 31% solids solution of said copolymer in xylene with 2.5 g. of a 40% solution of formaldehyde (0.5 mole) in n-butanol and water (51.5% and 8.5% of the solution respectively), in the presence of ammonium hydroxide at 95° C. for 7 hours under a nitrogen atmosphere. The resulting copolymer has a 98% Buton 100 content and 2% methylolated phenol.

To 96 parts of the resulting copolymer as a 40% solution in xylene, there is added 4 parts of cobalt naphthenate solution in mineral spirits in which the cobalt content is 6%. The coating is roller coated and baked in accordance with the procedure set forth in Example 1. The resulting films have the same desirable properties as do the films of Example 1.

Example 3

Following the procedure of Examples 1 and 2, a copolymer comprising 93% Buton 100 and 7% methylolated phenol is prepared. 98 parts of said copolymer as a 40% solution in xylene are admixed with 2 parts of cobalt naphthenate solution in mineral spirits in which the cobalt content is 6%. The coating is roller coated and baked in accordance with the procedure set forth in Example 1. The resulting films had the same desirable properties as did the films of Example 1.

Instead of Buton 100, other resins may be used to alkylate the phenols, e.g., polybutadiene homopolymer or polymers comprising isoprene, 2,3-dimethyl butadiene and 1-phenyl butadiene.

While there have been described what is at present considered to be the preferred embodiments of this invention, it will be obvious to those skilled in the art that various changes and modifications may be made therein without departing from the invention, and it is therefore, aimed to cover all such changes and modifications as fall within the true spirit and scope of the invention.

We claim:

1. A thermosetting surface coating composition comprising a volatile organic solvent solution of (A) a resin made by the alkylation of a phenol material selected from the group consisting of phenol, naphthol and 2,2-diphenol propane with a synthetic polymer containing more than 5 repeating units of a monomeric material selected from the group consisting of butadiene, alkyl substituted butadiene and phenyl substituted butadiene, said resin having a softening point below 22° C. and (B) a metal drier selected from the group consisting of cobalt, calcium, manganese and lead driers.

2. The coating composition defined in claim 1 wherein said metal drier is a naphthenate of said metal.

3. The coating composition of claim 1 wherein said phenol material is phenol.

4. The coating composition of claim 1 wherein said phenol material is 2,2-diphenol propane.

5. The coating composition of claim 1 wherein said synthetic polymer is a copolymer comprising butadiene and styrene monomers.

6. A surface coating composition comprising a volatile organic solvent solution of (A) methylolated resin made by reacting (1) formaldehyde and (2) a resin made by the alkylation of a phenol material selected from the group consisting of phenol, naphthol and 2,2-diphenol propane with a synthetic polymer selected from the group consisting of butadiene, alkyl substituted butadiene and phenyl substituted butadiene and (B) a metal drier selected from the group consisting of cobalt, calcium, manganese and lead driers.

7. The coating composition defined in claim 6 wherein said metal drier is a naphthenate of said metal.

8. The coating composition of claim 1 wherein the metal in the drier comprises from .001% to 1% of the total non-volatile content of said coating composition.

9. The coating composition of claim 1 wherein the phenol content of said resin is no greater than 7%.

10. The composition defined in claim 6 wherein the metal in the drier comprises from .001% to 1% of the total non-volatile content of said coating composition.

11. The coating composition of claim 6 wherein the phenol content of said methylolated resin is no greater than 7%.

References Cited

UNITED STATES PATENTS

| | | | |
|---|---|---|---|
| 2,627,475 | 2/1953 | Craig | 260—33.6 X |
| 2,948,702 | 8/1960 | Vogel et al. | 260—62 X |
| 2,957,786 | 10/1960 | Baumhart et al. | 260—33.6 |
| 2,863,786 | 12/1958 | Guth | 260—33.6 |
| 3,110,699 | 1/1963 | Schmitz-Josten | 260—62 |
| 3,124,555 | 3/1964 | Brown et al. | 260—62 |

OTHER REFERENCES

A.P.C. application Greth et al., Ser. No. 238,166, published Apr. 20, 1943.

Payne, "Organic Coating Technology," vol. I, John Wiley and Sons, New York, 1954, pp. 227, 228 and 232.

JULIUS FROME, *Primary Examiner.*

J. H. DERRINGTON, *Assistant Examiner.*